Feb. 6, 1940.  R. K. HONAMAN ET AL  2,189,110
VOLTAGE RECORDING DEVICE
Filed Sept. 18, 1936   2 Sheets-Sheet 1

INVENTORS
R. K. Honaman and
L. K. Supurt
BY
William R. Ballard
ATTORNEY

Feb. 6, 1940.　　　R. K. HONAMAN ET AL　　　2,189,110
VOLTAGE RECORDING DEVICE
Filed Sept. 18, 1936　　　2 Sheets-Sheet 2

INVENTORS
R. K. Honaman and
L. K. Swart
BY
William R. Ballard
ATTORNEY

Patented Feb. 6, 1940

2,189,110

UNITED STATES PATENT OFFICE 2,189,110

VOLTAGE RECORDING DEVICE

Richard Karl Honaman, Bloomfield, and Leland Kasson Swart, Mountain Lakes, N. J., assignors to American Telephone and Telegraph Company, a corporation of New York Application September 18, 1936, Serial No. 101,522

4 Claims. (Cl. 177—311)

This invention relates to voltage recorders, and more especially to a voltage recorder which discriminates between voltages which differ not only in magnitude, but in length of duration.

One of the objects of the invention is to provide a method and means for the separation of impulses of long and short durations. Another object is to provide a record of the number of times that certain types of voltages are impressed on a circuit. Still a further object is to obtain a record of how frequently such voltages may exceed certain specified values or lie within certain specified limits.

The invention is particularly adapted for use on transmission lines, circuits and apparatus subject to disturbing voltages from lightning and from adjoining power lines or systems. It is important in many cases, as on telephone lines, to know how frequently such disturbances occur, and further to know how many of the occurrences are due to lightning and how many are due to neighboring power systems. To this end we make use of the fact that lightning disturbances are usually of very short duration, whereas power line disturbances are likely to persist for a relatively longer period. By means of suitable delay circuits employing gas-filled tubes we are able to discriminate between and separate the impulses of long and short duration. Furthermore, by means of our circuit we are able to record in a step-by-step manner the number of times that the voltages of the one character or the other exceed certain values or lie within certain specified limits.

Figure 1:
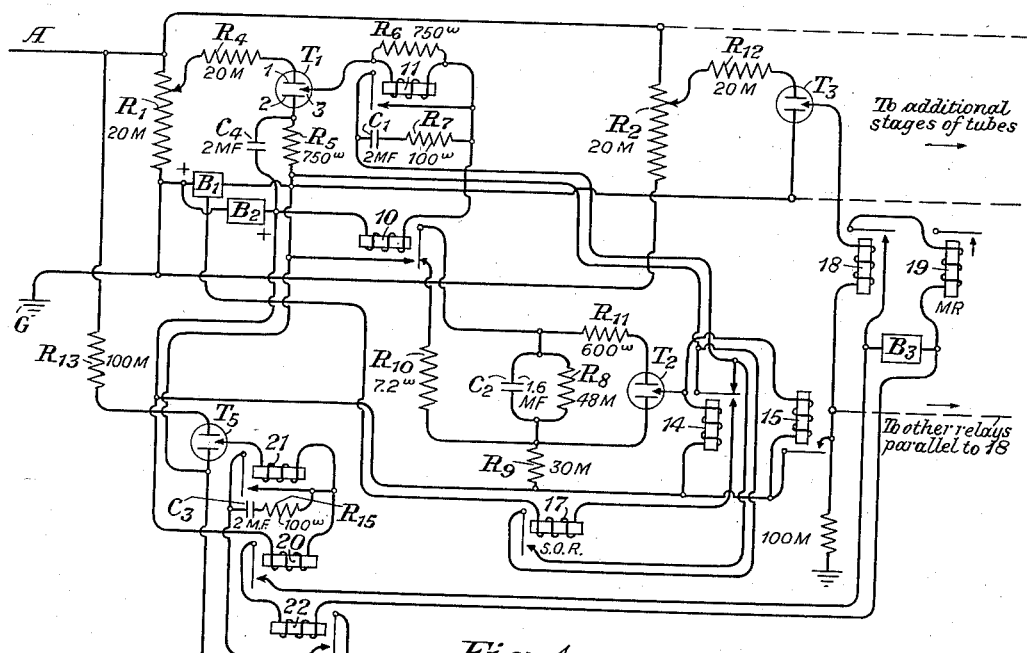
Figure 2:
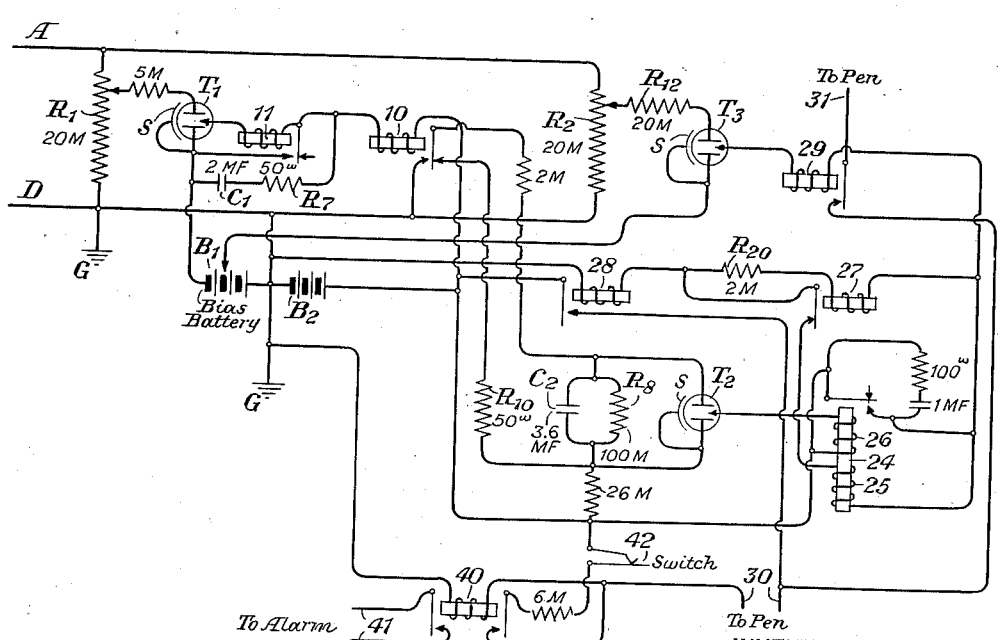
Figure 1A:
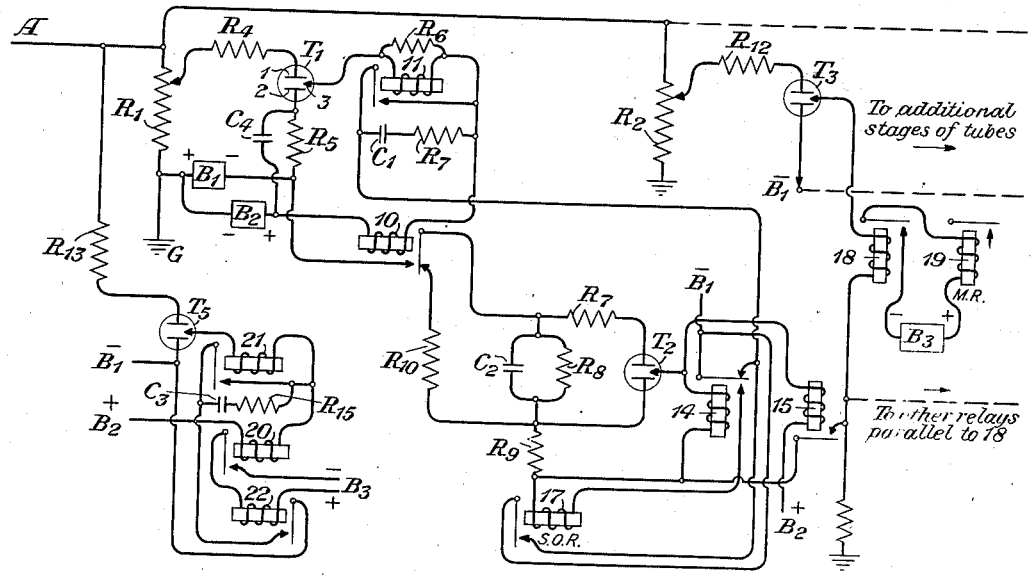
Figure 2A:
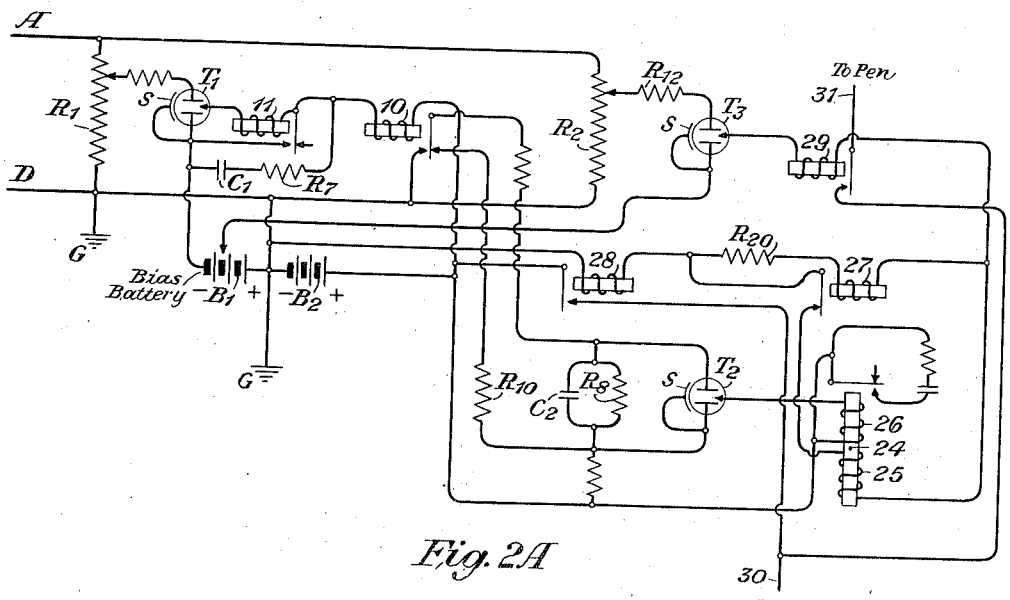

The invention will be better understood by reference to the following specification and accompanying drawings in which Figure 1 shows one circuit embodying our invention and Fig. 2 is a modification thereof. Figs. 1A and 2A are modifications of Figs. 1 and 2, respectively, and are added to clarify the disclosure. The latter Figures 1A and 2A are to be read with the corresponding Figs. 1 and 2.

Referring more specifically to Fig. 1, there is shown our measuring circuit with one terminal A to be attached to whatever line or circuit is under observation. From this terminal one passes through a plurality of resistances in parallel to ground at G, the function of these parallel resistances being described hereinafter. Associated with the first of these resistances $R_1$ is a gas-filled tube $T_1$. This tube, which is characteristic of the other devices used in the circuit, consists of a container with two electrodes 1 and 2 of similar material and structure. Also within said container is an additional electrode 3, which will hereinafter be referred to as the anode. The tube contains certain gases, such as argon or neon, and at such pressure that a discharge will occur between the electrodes 1 and 2 when a certain critical voltage is impressed thereon. For example, the tubes might very well be adjusted to break down at 70 volts. Since the electrodes 1 and 2 are similar in character, the discharge may occur in the one direction or the other with equal facility, provided no bias potential is used. If the electrode 3 is included in any derived circuit which contains voltage, then current will flow through the derived circuit comprising the electrode 3 and either of the electrodes 1 or 2, after the gap from 1 to 2 has been broken down. This will be true even though the voltage in the derived circuit is not sufficient in itself to cause a breakdown of the discharge tube. In this particular circuit it will be observed that tube $T_1$ is connected in a circuit comprising a resistance $R_1$, a resistance $R_2$, a resistance $R_5$ and battery bias $B_1$. The voltage of the battery $B_1$ is such as to be below the critical breakdown voltage of $T_1$. If, however, an additional voltage is introduced into the circuit just described by virtue of a potential of the right polarity coming from the circuit under observation and giving rise to a current through $R_1$ to ground, then the tube $T_1$ will break down. Immediately circuit will be established as follows: Battery $B_2$, relays 10 and 11, the gas tube $T_1$ through the anode 3, resistance $R_5$, battery $B_1$. The relays 10 and 11 are of a very fast operating type.

It will be observed that a resistance $R_4$ is shown in series with the tube $T_1$ and resistance $R_1$, this being for the purpose of limiting the current which may flow through the tube from the terminal A. Resistance $R_5$ may be introduced to adjust the current flowing through relays 10 and 11 when the tube $T_1$ breaks down and to permit the use of a value of bias which may exceed the sustaining value of ionization between input electrodes. Resistance $R_6$, shunted around the relay 11, may be introduced to adjust the current flowing through relay 11.

The operation of relay 11 closes a circuit through its contact and through the back contact of relay 14, if this latter relay is not operated. The completion of this circuit places a direct short around the relay 11, the tube $T_1$ and resistance $R_5$, thus bringing about deionization of $T_1$, if the ionizing voltage at A is no longer present.

The opening of the circuit at $T_1$ will cause the contacts of relay 11 to be opened, whereupon the tube will no longer be shorted, and if the disturbing voltage is still present, the tube $T_1$ will again be immediately ionized, the relay 11 will be excited and the performance repeated. Thus the contact of relay 11 will vibrate back and forth, opening and closing its circuit so long as disturbing voltage is present at A. The relay 10, which may be of the same type as 11, will also have been held operated and its contact would ordinarily be vibrating, except that a hangover device vided comprising condenser $C_1$ and resistance $R_7$. As long then, as the contacts of 11 continue to vibrate, i. e., as long as disturbing potential is present at A, the relay 10 will remain operated.

Attention is now called to the gas-filled tube $T_2$, which is bridged across a circuit comprising condenser $C_2$ and resistance $R_8$ in parallel. This condenser circuit is normally shorted through the back contact of relay 10.

Voltage is provided to the condenser $C_2$ from battery $B_2$ through a large resistance $R_9$, condenser $C_2$, front contact of relay 10 when operated, and to negative of battery $B_1$. When relay 10 is operated, the condenser $C_2$ commences to charge up at a rate which is determined by the size of the capacity and the resistance $R_9$. At the same time that the condenser is being charged from the battery, it also tends to discharge through and at a rate determined by the resistance $R_8$. If, however, the relay 10 remains operated long enough, then the charging of condenser $C_2$ will build up a potential difference sufficient to cause the tube $T_2$ to break down and to remain broken down so long as relay 10 operated. Included in the short circuit around the condenser $C_2$ is a small resistance $R_{10}$ to prevent excessive current through the back contact of relay 10. Also, in series with $T_2$ is a resistance $R_{11}$ to prevent excessive current through the tube.

From the circuit as thus far described, it will be observed that a certain discrimination has been obtained. The tube $T_1$ will break down for any and all impulses at A exceeding a certain predetermined value. The tube $T_2$, however, will break down only if the disturbance persists for longer than a predetermined time, this time being entirely under control through the magnitude of the condenser $C_2$, the applied potential to the condenser and the various resistances.

Breakdown of $T_2$ establishes current through the following circuit: From positive of $B_2$, fast-operating relays 14 and 15 in parallel, anode of $T_2$, resistance $R_{11}$, front contact of relay 10, negative of $B_1$. Operation of relay 14 makes it impossible to short circuit the tube $T_1$ so that it will continue in the ionized condition so long as the disturbing impulse continues or until relay 14 operates to establish a circuit through the slow-operate relay 17, which in time will permit the shorting and deionization of tube $T_1$. Operation of relay 15 connects positive of $B_2$ through relay 18 to anode of gas tube $T_3$. Nothing occurs here, however, unless $T_3$ has been broken down in a manner similar to $T_1$.

It will be noted that $T_3$ normally has impressed upon it the voltage of $B_1$ which, however, is insufficient to cause breakdown. When sufficient disturbing voltage, however, appears at A, then the additional drop through $R_2$ will bring the voltage across $T_3$ to a sufficient value to cause breakdown. The potential at the point A required for this can be made adjustable by the potentiometer connection from the tube $T_3$ to resistance $R_2$. Thus it may be arranged so that the relay 18 is operated only if the potential at A lasts longer than the predetermined time required to operate $T_2$, and only if it exceeds a specified desired value. Operation of relay 18 immediately closes circuit from battery $B_3$ through relay MR designating a measuring or marking relay. This relay is used to operate a pen marking on a moving tape, or to operate any other appropriate recording mechanism.

The anode of tube $T_3$ is shown connected through the winding of relay 18 and a 100,000 ohm resistor to ground. This grounded circuit is employed to dissipate any charge on the anode while the gas of tube $T_3$ is deionized. The gas of tube $T_3$ will become ionized when a sufficiently high voltage becomes applied to its two cathodes (shown as flat plates) as already explained and the gas will become deionized when the previously applied high voltage disappears. The winding of relay 18 will be effectively deenergized as soon as relay 15 releases.

From the above it will be seen that by virtue of its delay characteristics the circuit as thus far described definitely discriminates between impulses of short and long duration. No record is produced by the relay MR, unless the disturbing voltage has persisted for more than a certain length of time and has exceeded a certain predetermined value.

In addition to recording these relatively long duration impulses, it is desirable to know how many times impulses of any nature exceeding certain values occur. To this end a gas discharge tube $T_5$ is connected in a manner analogous to that of $T_1$, so that it normally has impressed across its terminals the voltage of $B_1$. In the presence of excessive voltage at A, the tube $T_5$ will break down, excessive current being prevented by resistance $R^{13}$. Breakdown of $T_5$ establishes circuit from $B_2$ through the fast acting relays 20 and 21 and anode of $T_5$ to negative of $B_1$. Operation of relay 20 closes circuit from $B_3$ through the marking relay 22, which will in turn operate a pen or other recording device to indicate each occurrence of excessive voltage at A without regard to whether it is of long or short duration. Operation of relay 22 will also permit the contact of 21 to short circuit the tube $T_5$ if 22 has operated, bringing about deionization and thus causing the contact of 21 to vibrate so long as the voltage persists at A. A hangover circuit comprising condenser $C_3$ and resistance $R_{15}$ is provided for the relay 20, thus operating in precisely the same manner as described for the hangover for relay 10. Thus the relay 22 will mark but once for each disturbance at A no matter how long may be its duration.

The recorder connected with 22 will give the total number of disturbances occurring within a given interval of time. The recorder connected with 19, however, discards all the impulses due to lightning flashes, and records only those which will persist for a longer period of time, these normally being disturbances due to power systems. The difference between the two records, then, will also give the information as to the number of lightning disturbances in the given interval.

It will at times be desirable to know approximately the voltage of the various long duration impulses. This may be accomplished by means of a plurality of tubes corresponding to $T_3$. The tube $T_1$ can be adjusted to break down at a fairly low value of say 15 volts by the setting on the resistance $R_1$, but additional stages of tubes and resistances corresponding to $T_3$ and $R_2$ may be connected to the terminal in identically the same manner, each being set to trip only for successively higher values of potential at A. Each of such succeeding tubes would be provided with relays corresponding to 18 and marking relays corresponding to 19. Thus the stage $T_3$ could be adjusted to record only voltages exceeding 15 volts, etc. The following one could be adjusted to record only over 30 volts, and so on for as many steps as desired, and for steps of as large or as small values as desired. The difference between the readings of two successive records would give the number of impulses of long duration which come within the limits of the voltages for which those two records are set.

In the specification the different elements have been referred to by reference characters with no detailed statements as to the magnitudes of the different elements. For a better understanding of the invention, however, we have indicated on the drawing some values which would be appropriate. In that connection the character $\omega$ represents ohms and M represented thousands of ohms. Thus 20M represents 20,000 ohms.

The circuit of Fig. 2 is similar in many respects to that of Fig. 1, but with certain modifications. Thus the tubes $T_1$, $T_2$ and $T_3$ function in substantially the same way as in Fig. 1. They are here shown with metallic shields S, which may or may not be used, as desired to exclude light and for electrostatic field shielding in both the tubes of this circuit and the tubes of Fig. 1. The tube $T_3$ would be followed by additional stages to record step-by-step increasing voltage of the disturbances. The resistance $R_1$ is shown connected across a line at the terminals A and D, the terminal itself being shown grounded at G. The relays 10 and 11 operate in the same manner to control the delay circuit $C_2R_8$. Thus $T_2$ is not operated unless the disturbances at A exceed a certain predetermined length of time. It will be observed, however, that the short circuiting of the tube $T_1$ by the contact of relay 11 is not subject to a relay controlled by $T_2$, thus reducing lost measuring time between impulses that may be recorded.

In this Fig. 2 the relays 14 and 15 of Fig. 1 are replaced by a single two-winding relay 24. The one-winding 25 serves as a lock-up through the back contact of relay 27. It will be noted also that operation of $T_2$ puts battery voltage $B_2$ through front contact of relay 24 on the relays 27 and 28 in series with each other and with suitable resistance $R_{20}$ to control the current. Operation of relay 27, which is a slow-operate relay, unlocks the relay 24. Operation of relay 28 controls the operation of a recording device, such as a pen recorder stamping device, etc., which is indicated at 30. It will be noted that operation of $T_2$ also puts positive of $B_2$ on the anode of $T_3$, which if in an ionized condition permits operation of relay 29. This condition of ionization results only if the voltage at A has been sufficient to break down tube $T_3$. The relay 29 in turn controls a pen or other recording device.

It will be seen that as thus far described the circuit of Fig. 2 is a two-stage measuring arrangement being set to record only if the impulses are of a duration exceeding that necessary to operate the delay tube $T_2$, this being ordinarily set to exclude lightning effects and record only those of appreciably longer duration. The recording device 30 will make a record for all impulses exceeding this in duration and exceeding a certain predetermined voltage. The pen 31 would operate only under additional voltage and only on impulses exceeding the voltages to which recorder 30 responds by a definite amount predetermined by the setting of the resistances of the circuit. In Fig. 2 there is shown one of a variety of alarm circuits which can be used. Thus, when the recorder 30 is operated by closing of contacts of relay 28, current also passes through relay 40 to operate an alarm circuit 41. A lock-up circuit for relay 40 is provided through the switch 42. The alarm remains operated until released by an attendant. The pen recorder is used to indicate the time of an operation and is not ordinarily employed when there is an attendant to reset the alarm and to log the time of its operation.

While it has been implied that the gas tubes of any one circuit, or of the two circuits, are identically the same, this is not necessary. Thus some of the tubes in any one circuit may be argon tubes, or they may be neon tubes or mixtures thereof, this being determined largely by the voltages at which it is desired to have any one tube break down and the desired speed of deionization of the gas.

It is evident that many changes may be made in these circuits and the circuit arrangements without departing from the spirit of our invention, and all such changes should be considered as coming within our invention as claimed.

What is claimed is:

1. The combination of two gas discharge tubes, a circuit including means responsive to all impulses exceeding a predetermined voltage value to ionize the gas of one of said tubes, said circuit also including means responsive to all impulses exceeding a predetermined duration to ionize the gas of the second tube, a plurality of gas discharge tubes connected to said circuit, means to ionize the gas of the tubes of said plurality at successively higher voltages, and a plurality of translating devices each of which is coupled to one of said tubes and to the second tube, each operation of a translating device indicating a breakdown of the gas of the tubes to which it is coupled.

2. In a measuring device for responding to the impression of disturbing voltages on a circuit, said device comprising a series of three tubes coupled to each other, a translating device, means for breaking down the first tube in response to all substantial disturbing voltages on said circuit, the second tube being controlled by the first, means including a timing apparatus for breaking down said second tube only if the first is responsive for more than a specified duration of time, means for breaking down the third tube in response to disturbing voltages on said circuit exceeding a specified value, and translating means controlled by the second and third tubes and operating said translating devices only if both the second and third tubes are themselves broken down.

3. The combination of claim 2 characterized by the presence of a plurality of tubes corresponding to the third tube and connected in parallel thereto, each such tube being broken down at a definite but different value of disturbing voltage on the circuit.

4. The combination of claim 2 characterized by the presence of a plurality of tubes corresponding to the third tube and connected in parallel thereto, each such tube being broken down at a definite but different value of disturbing voltage on the circuit, and a plurality of translating devices, one controlled by each of said parallel tubes to translate the number of disturbances present on the circuit exceeding the voltage for which the tube is broken down.

RICHARD KARL HONAMAN.
LELAND KASSON SWART.